US007206662B2

(12) United States Patent
Sparenborg et al.

(10) Patent No.: US 7,206,662 B2
(45) Date of Patent: Apr. 17, 2007

(54) CRANE INSTALLATION, IN PARTICULAR CONTAINER CRANE

(75) Inventors: Ernst Sparenborg, Delmenhorst (DE); Stephan Wöbse, Kirchlinteln (DE)

(73) Assignee: Siemens Aktiengesellschaft, München (DE)

( * ) Notice: Subject to any disclaimer, the term of this patent is extended or adjusted under 35 U.S.C. 154(b) by 241 days.

(21) Appl. No.: 11/043,027

(22) Filed: Jan. 25, 2005

(65) Prior Publication Data

US 2005/0247657 A1 Nov. 10, 2005

Related U.S. Application Data

(63) Continuation of application No. PCT/DE2003/002450, filed on Jul. 21, 2003.

(30) Foreign Application Priority Data

Jul. 25, 2002 (DE) ............................... 102 33 875

(51) Int. Cl.
*G06F 7/00* (2006.01)

(52) U.S. Cl. ...................... 700/213; 700/249; 700/256; 700/20; 700/21; 212/76; 212/77; 212/83; 212/86; 212/276; 212/278

(58) Field of Classification Search ................ 700/213, 700/214, 2, 9, 20, 21, 245, 249, 256; 212/76, 212/77, 83, 86, 276, 278, 201, 310, 325
See application file for complete search history.

(56) References Cited

U.S. PATENT DOCUMENTS 3,833,130 A * 9/1974 Gerdes et al. .............. 212/278
4,172,685 A 10/1979 Nabeshima et al.
4,487,741 A 12/1984 Vuckovich et al.
5,160,056 A * 11/1992 Yoshimatsu et al. ........ 212/277
5,217,126 A * 6/1993 Hayashi et al. ............. 212/277
5,732,835 A 3/1998 Morita et al.
5,823,370 A * 10/1998 Ueda .......................... 212/276
5,967,347 A * 10/1999 Miyata et al. .............. 212/286
6,170,681 B1 * 1/2001 Yoshimatsu ................. 212/278
6,809,495 B2 * 10/2004 Rodnunsky ................. 318/649
6,880,712 B2 * 4/2005 Uchida et al. .............. 212/276
6,962,091 B2 * 11/2005 Lukas ........................ 73/865.9
2005/0035077 A1 * 2/2005 Wimmer ..................... 212/276

FOREIGN PATENT DOCUMENTS

| | | |
|---|---|---|
| DE | 86 21 010 | 9/1987 |
| DE | 39 33 505 | 4/1990 |
| DE | 196 12 423 | 10/1997 |
| DE | 199 05 019 | 8/2000 |
| EP | 0 595 222 | 5/1994 |
| JP | 07187569 | 7/1995 |

* cited by examiner

*Primary Examiner*—Khoi H. Tran
(74) *Attorney, Agent, or Firm*—Henry M. Feiereisen

(57) ABSTRACT

A crane installation, especially a container crane, includes at least one hoist mechanism provided with at least one motor for lifting and lowering a load suspended from the hoist mechanism. The operation of the hoist mechanism is controlled by a control unit which receives load-specific information signals from a device. The load-specific information signals are determined on the basis of load-dependent measuring signals generated by a load measuring assembly associated with the hoist mechanism.

11 Claims, 3 Drawing Sheets

CRANE INSTALLATION, IN PARTICULAR CONTAINER CRANE

CROSS-REFERENCES TO RELATED APPLICATIONS

This application is a continuation of prior filed copending PCT International application no. PCT/DE2003/002450, filed Jul. 21, 2003, which designated the United States and on which priority is claimed under 35 U.S.C. §120, and which claims the priority of German Patent Application, Ser. No. 102 33 875.2, filed Jul. 25, 2002, pursuant to 35 U.S.C. 119(a)–(d).

BACKGROUND OF THE INVENTION

The present invention relates, in general, to a crane installation, and more particularly to a container crane of a type having a hoist mechanism with one or more motors for lifting and lowering a suspended load, and a control unit for controlling operation of the hoist mechanism.

Nothing in the following discussion of the state of the art is to be construed as an admission of prior art.

Crane installations of this type are generally used for loading and unloading of container ships. The crane typically includes a trolley which travels along a boom spanning over the ship and a hoist mechanism attached to the trolley. Suspended from the hoist mechanism via ropes is a load-carrying frame, normally a container spreader which grabs a container for loading onto the ship or unloading from the ship. The hoist mechanism normally includes one or more motors for driving one or more drums, used for winding the ropes, to thereby lift or lower a load. This type of crane installation is referred to also as single-trolley container crane. Another construction involves the configuration of a two-trolley container crane installation which has two separate trolleys, each having its own hoist mechanism. One trolley, referred to as primary trolley, assumes the actual loading and unloading of the ship for placing a container from the ship on a placement area on the side of the crane or for transferring a container from the crane-side placement area to the ship. The other trolley is referred to as gantry trolley and transports the container from the placement area to a crane-distal transport vehicle, e.g. a driverless terminal vehicle or a railway car, or removes the container from the transport vehicle for transfer to the placement area, oftentimes also called reception platform.

These types of container crane installations suffer shortcomings when the loads are bulky or when loads of unknown weight need to be transshipped. These situations oftentimes subject the hoist mechanism and motors to extreme stress that frequently results in damage. Also in the event of an uneven load distribution, the boom may be exposed to inadmissible forces that in extreme cases can impact the static of the crane.

It would therefore be desirable and advantageous to provide an improved crane installation to obviate prior art shortcomings.

SUMMARY OF THE INVENTION

According to one aspect of the present invention, a crane installation, in particular container crane, includes a hoist mechanism having at least one motor for lifting and lowering a suspended load and at least one hoist rope operatively connected to the motor and the load, a load measuring assembly, operatively connected to the hoist mechanism, for generating a load-dependent measuring signal, a device for determining a load-specific information signal in response to the load-dependent measuring signal, with the device constructed to determine the load-specific information signal on the basis of an actual length of the hoist rope, a first control unit for controlling operation of the hoist mechanism in dependence on the information signal, and a second control unit operatively connected to the device and constructed for detecting an overload and/or special load and for monitoring control operation of the first control unit in the presence of an overload and/or special load.

The load-specific information signals, which contain already information about the grabbed actual load, can be ascertained substantially continuously. In response to these information signals, which may involve, e.g., the total weight of the suspended load, the control unit is able to operate the motor(s) accordingly so as to avoid the occurrence of power surges, inadmissible overheating, etc. Thus, when the information signals indicate the presence of a very large load, the motor(s) may then be operated at lower speed to keep heat-up or stress within acceptable limits. The signal-dependent control of the motor(s) enables an operation of the hoist mechanism in dependence on the actual load situation so that possible extreme situations can be recognized and suitably and appropriately coped with to prevent overload with accompanying grave results.

The device for determining the information signals can be so constructed as to take into account the actual length of one or more hoist ropes that carry the load. The total weight acting on the hoist mechanism is also determined in response to the hoist ropes. The longer the hoist ropes, the greater the weight suspended from the hoist mechanism. In other words, when taking into consideration the actual length of a hoist rope during continuous acquisition of information signals, the momentary information signal can be matched even more precisely to the actual situation at hand. The information about the actual rope length at any point in time can be transmitted to the device via the control unit which controls operation of the hoist mechanism and ultimately also the rope length. In addition, information can be derived about the angle of the rope in relation to the spreader or container. When the ropes are of very short length, i.e. the container has to be lifted over a great height, the ropes extend at a relatively great angle away from the vertical in relation to the spreader. When being relatively long, the rope extends substantially vertical from the spreader to the hoist mechanism. The load distribution changes in dependence on the angle; a fact which is also suitable for the determination of information signals to describe the actual load situation as precisely as possible.

The provision of the second control unit ensures a supervision of the first control unit in the event of extreme situations involving the lifting of an unconventional load or overload. While the first control unit is provided to primarily control the operation of the hoist mechanism, the second control unit assumes monitoring functions and receives relevant information signals from the signal determination device. There is thus a communication of the second control unit with the first control unit so as to allow recognition of the control mode which the first control unit executes in the situation at hand.

The device for determination of load-specific information signals can be constructed for determination of signals that contain different information. The device may be constructed to ascertain an overall load signal, i.e. information is provided about the total load suspended from the hoist mechanism. In addition, the device may be able to ascertain an overload, i.e. an excessive load is received as admissible, or may be used to determine information signals in response to an uneven load distribution. In the latter case, the first control unit recognizes, for example, when the container is heavier on one side than on the other side so that the hoist mechanism is exposed via the ropes to an uneven load distribution. In this way, the control unit is able to more precisely operate the motor(s) in response to a perceived uneven load distribution.

In order to generate different information signals with different information content, it may be suitable to provide the load measuring assembly with a plurality of load measuring elements in spaced-apart relationship, with the device being constructed to determine the load-specific information signals on the basis of individual measuring signals, or two measuring signals, or a plurality of variously combined measuring signals. The load measuring elements may be configured in the form of strain gauges. Depending on which of the measuring signals are combined for signal evaluation of the load measuring signals, different information signals can be generated, such as, e.g., an information signal for indicating a possible side load or a possible tilting load.

According to another feature of the present invention, the device may determine the load-specific information signals by comparing the measuring signals with maximum and minimum comparative values. It is hereby possible to compare each individual measuring signal with a comparative value, or, depending on which information signal should be produced, compare combination signals, ascertained from individual measuring signals, with comparative values, whereby maximum limit values are used to enable indication of an overload or special (unconventional) load. Minimum values are used to enable recognition of e.g. a slack in the rope, i.e. a hoist rope sags when unloaded.

The load measuring assembly may be disposed at any location so long as to allow a direct or indirect measure of the load suspended from the hoist mechanism. Currently preferred is however, an arrangement of the load measuring assembly on a trolley which travels along a track and is constructed for attachment of the hoist mechanism.

As described above, the signal determination device is able to ascertain signals of different types, in particular when generating signals on the basis of varying combinations of single load signals. For example, an information signal may be acquired commensurate with the total weight, total overload, side load, tilting load or also individual rope load. In particular, when indicating an overload in response to an information signal from the device, the first control unit may be so operatively connected to the device as to allow only a lowering of the load. In other words, when the device registers during lifting the presence of an overload, the hoist mechanism is immediately halted to remain in the momentary elevated position and then the load is lowered, barring any further lifting action. The signal determination device generates through comparison with a limit value an information signal which in this scenario indicates, for example, that the load exceeds the limit value. The limit value is hereby dependent on the constructive features of the crane as well as on the configuration of the hoist mechanism. The actual evaluation or qualification of the signal is realized in the control unit which checks the actual load situation at hand.

According to another feature of the present invention, the first control unit is constructed to recognize the presence of a special load, when the motor of the hoist mechanism breaks down and the load-specific information signal transmitted from the device indicates the presence of the special load. Also in this case, the signal determination device provides continuously one or more information signals to describe the load, with the first control unit qualifying the content of the information signals. For example, in case four motors are provided, whereby two of the motors fail to operate, the first control unit is able to operate the two remaining motors; however, the motor control needs to be modified. On the basis of the given information signals, a particular load scenario can now be recognized by the control unit, which is especially the case when relatively large loads are lifted. In this case, the control of the remaining motors is modified to prevent an overload. For example, the lifting motion may be carried out intermittently to enable the motors to cool down for a time period. A different motor control is applied, when three of the four motors are operative. Conceivable is also a scenario that allows qualification of the signals in the signal determination device per se, in which case the device receives e.g. information from the control unit that one or more motors have failed. In this case, it becomes possible to use different limit values for the signal determination device in dependence on the respective breakdown scenario in response to the signal from the control unit in order to determine whether an unconventional load situation is present that requires specific modifications of a motor control, or whether the load is still small enough to continue the normal control operation.

According to another feature of the present invention, the second control unit may be constructed to trigger a rapid halt of operation or initiate an emergency stop, when, for example, the first control unit has not stopped a lifting motion in the event of an overload, when in fact it should have lowered the load. The second control unit is thus provided to implement a halting of the hoist mechanism, when required. Although the second control unit does not assume any control or regulation functions, it may, of course, also be possible to construct the second control unit for carrying out such functions.

According to another feature of the present invention, a monitor for the crane operator may be provided for displaying load information in response to the determined information signal. The monitor may suitably be installed in the crane cab on the trolley for conjoint movement therewith. In other words, the crane operator is able to receive continuously information about the detected load and thus of course also information about possible load errors or danger situations. This is especially important, when the operation of the hoist mechanism and of the trolley is semiautomatic, in which case, the crane operator manually performs the final control activities relating to grabbing or placement of the containers, whereas all other lifting and driving controls are executed automatically.

As described above, the crane installation may be constructed as single-trolley container crane but also as two-trolley crane which includes a second trolley traveling along a separate second boom and operatively connected to a further separate hoist mechanism. Control of both trolleys and both hoist mechanisms can be realized by a common control unit, optionally by a common first control unit and a common second control unit, which separately process the information signals from the load measuring assemblies that are respectively associated to each trolley or each hoist mechanism.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
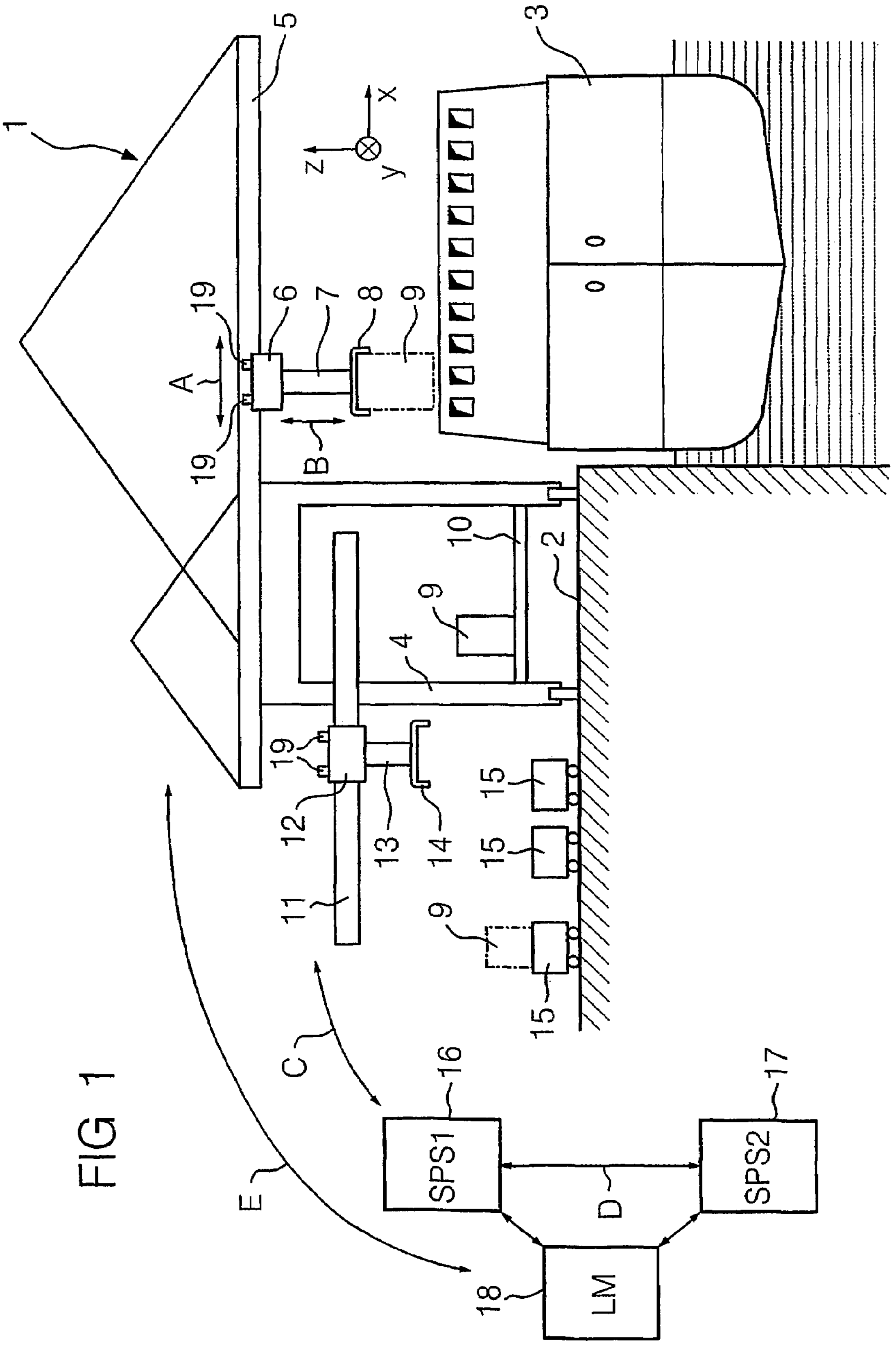
FIG. 1 is a principal illustration of a crane installation according to the present invention in the form of a two-trolley container crane.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a principal illustration of a crane installation according to the present invention in the form of a two-trolley container crane, generally designated by reference numeral 1 and moveable by a traveling gear along a quay wall 2 in length direction of a container ship 3. The crane installation 1 includes a crane base 4 for support of a boom 5 which is sized to fully span across the width of the ship 3. A trolley 6, representing the primary trolley, is mounted to the boom 5 for travel along the boom 5 as indicated by double arrow A and carries via hoist ropes 7 a container spreader 8 which, as shown by way of example in FIG. 1, grabs a container 9, shown by broken lines. The spreader 8 is suspended from the hoist ropes 7 and displaceable vertically by means of a trolley-side hoist mechanism, as indicated by arrow B.

The crane installation 1 is intended to transfer the container 9 onto a placement area 10, when being unloaded from the ship. The placement area 10, also called reception platform, is sized to receive several containers 9. As shown by way of example in FIG. 1, a further container 9 has already been positioned by the trolley 6 on the placement area 10.

The crane installation 1 further includes a second boom 11 on which a second trolley 12, representing a gantry trolley, is arranged. A container spreader 14 is connected via hoist ropes 12 to the trolley 12 for movement. The trolley 12 and the spreader 14 have also access to the placement area 10 so as to be able to transfer a container 9 from the placement area 10 to a transport vehicle 15 positioned to the side of the crane base 4. Three transport vehicles 15 are shown by way of example in FIG. 1, with the left-most transport vehicle 15, e.g. a railway car or driverless transport vehicle, being loaded with a container 9, shown by broken lines.

Loading and unloading takes thus place in two stages. Unloading involves removal of a container 9 from the ship 3 by the trolley 6 which transfers the container 9 to the placement area 10. This container 9 is then picked up by the trolley 12 from the placement area 10 and transferred to a transport vehicle 15. The loading process of a container 9 onto a ship 3 is realized in reverse sequence.

Loading and unloading operations by the container crane installation 1 can be controlled semi-automatically or can be fully automated, including also the travel of the trolleys 6, 12 and the lifting operation of the spreaders 8, 14, by a stored-program control unit 16 which is provided on the crane installation 1. A bidirectional data communication is involved here between the traveling gears and hoist mechanisms and other relevant operating elements and the control unit 16, as indicated by double arrow C. Loading and unloading requires the provision of particular container-specific assignments which relate to certain data for identification of the container and instructions as to which further actions should be undertaken for the container. These data are processed in the control unit 16 which controls the operation of the crane installation 1, i.e. the trolley operation and hoist mechanism, in dependence on the data.

The crane installation 1 further includes a second control unit 17 which communicates bidirectionally with the first control unit 16, as indicated by double arrow D. The control unit 17 is provided primarily to monitor the control and regulating operations of the control unit 16 and may, in the event of an emergency, e.g. when the control unit 16 sends incorrect commands for the situation at hand, intervene to trigger a rapid halt or emergency stop of the operation of the trolley or hoist mechanism.

The crane installation 1 further includes a device 18 for determination of load-specific information signals. As indicated by double arrow E, the device 18, e.g. a computing device or processing device, receives information from load-measuring elements 19 disposed on the trolleys 6, 12. The illustration of two load measuring elements 19 on the trolleys 6, 12, respectively, is done by example only. Of course, more than two load measuring elements 19 may be provided. In fact, currently preferred is the arrangement of eight separate load measuring elements 19. Each of the load measuring elements 19 includes a strain gauge measuring bridge. For example, four load measuring bolts may be used with two strain gauge measuring bridges, or eight load measuring bolts may be used, each including a strain gauge measuring bridge, as will be described in more detail hereinafter. Of course, it is also possible to provide each of the trolleys 6, 12 with its own device 18 which communicates with the respective load measuring elements 19.

The device 18 receives the respective signals from the load measuring elements 19 and evaluates these signals individually for the trolleys 6, 12. The determined information signals are transmitted primarily to the first control unit 16 and partly also to the second control unit 17. The first control unit 16 receives, for example, as analog values all measuring values of the eight load measuring elements 19, the determined total weight, possible side loads to the right and left of the trolley, whereas, for example, a total overload signal, a slack rope signal, a special load signal, or side load or tilting load errors, or single rope load errors are transmitted as digital values across the communication bus. The second control unit 17 receives primarily the digital slack rope signal, a special load signal, or an overload signal.

To determine the different information signals, the individual measuring signals of the load measuring elements can be combined in varying ways.

Figure 3:
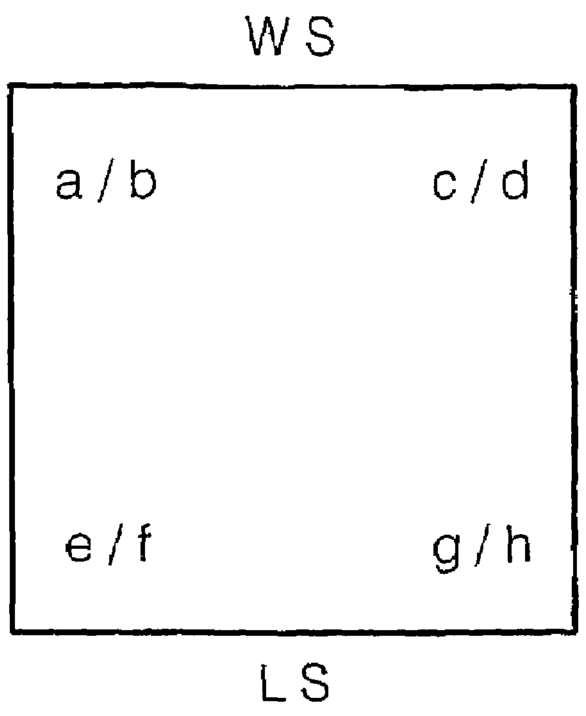
FIG. 3 is a principal illustration of spaced-apart arrangement of load measuring elements on a primary trolley.

FIG. 3 shows by way of example the arrangement of the load measuring elements on the trolley 6 (primary trolley). More specifically, four pairs of eight separate load measuring elements are provided and labeled here by reference characters a, b, c, d, e, f, g, h, for ease of explanation. The arrangement of the load measuring elements on the trolley 6 is such that two neighboring load measuring elements are combined, respectively, so to form load measuring pairs a/b, c/d, e/f and g/h, whereby load measuring pairs a/b and c/d are disposed adjacent to the water side WS, whereas load measuring pairs e/f and g/h are disposed adjacent to the land side LS.

The total load can be controlled by adding the load measuring elements a, c, e, g, for example. The parallel load measuring elements b, d, f, h can be used for a countercheck. The device 18 compares the determined value with an upper limit value and checks whether the limit value is exceeded. If this is the case, an overload signal is generated. When the determined value falls below a lower limit value, a slack rope recognition signal is outputted. Summation of all eight load measuring elements a–h is, of course, also possible.

The total load signal, determined through summation of the individual load measuring elements, enables the control unit 16 to recognize also a so-called special load situation which, for example, involves a scenario in which two out of four motors of the hoist mechanism integrated in the trolley 6 break down so that only two motors are operative. In this situation, the two operative motors must now be controlled differently compared to the situation when all four motors are work properly. In the event, the total load signal is high in this scenario, the control unit 16 quasi carries out an evaluation and qualification of the given signal, and recognizes a special load situation for accordingly controlling the remaining motors to prevent overload.

A side load can be controlled, using the example of FIG. 3, by summing the load measuring elements a, e, as well as the load measuring elements c, g. The remaining load measuring elements b, d, f, h, are again provided for countercheck. A comparison with appropriate comparative limit values, which indicate a maximum side load value, is then performed. When the maximum side load value is exceeded on either side, a side load error signal is transmitted to the control unit 16. A same procedure is implemented with respect to a comparison with a minimum side load. A comparison with the minimum side load value also triggers a side load error signal, when the determined value falls below the minimum side load value.

A possible tilting load can be detected by using the load measuring elements a, c, e, and g. In other words, a possible tilting load in the forward and rearward trolley regions can be determined. Also in this case, maximum and minimum values are calculated and compared with respective limit values. When exceeding the maximum admissible tilting load, or when falling short of a minimum admissible tilting load, a respective tilting load error signal is generated.

Individual rope loads can be determined by using the single measuring values of the load measuring elements a–h per se, primarily those of the load measuring elements a, c, e, g. When a comparison with a respective limit value results in a determination that the maximum admissible individual load has been exceeded, an appropriate single load error signal is generated.

Another option involves a comparison and quasi control of two load measuring elements. Thus, the load measuring elements a and c are compared with one another. Likewise, the load measuring element pairs c/d, e/f and g/h are compared with one another. When the comparison reveals an excessive difference between the individual parallel load measuring elements, which ideally deliver the same measuring signals, an error signal commensurate with the respective load measuring element is transmitted to the control unit 16.

Depending on the configuration of the information signal as transmitted from the device 18 to the control unit 16, the control unit 16 may, if need be, modify the operation of the hoist mechanism and in particular the operation of the motor(s) is adjusted in response to the information content of the information signal—whether the information content is derived directly from the signal of device 18 or whether the information content is associated by the control unit 16 especially in the event of a special load operation. In the absence of a signal to indicate a special load situation, it is possible to operate with, e.g., preset parameters. Also possible is generally a control process which s dependent on the total weight. In other words, the control operation is related to the total load to operate the motor(s) in an optimum manner.

Figure 4:
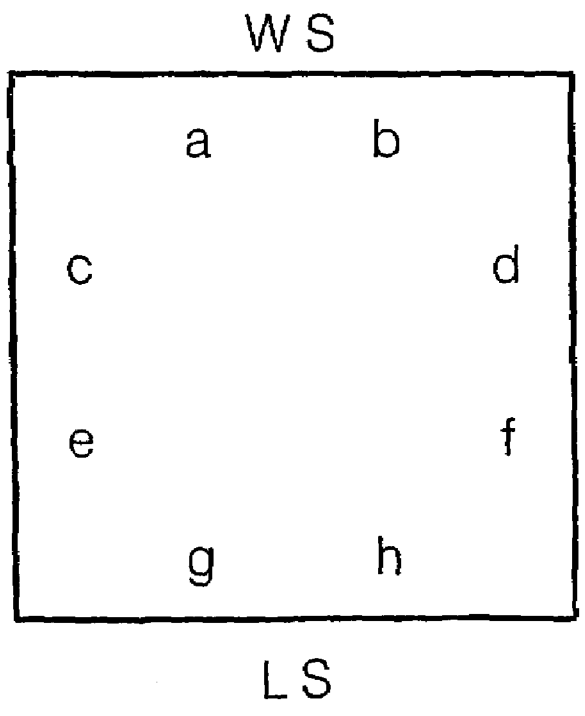
FIG. 4 is a principal illustration of spaced-apart arrangement of load measuring elements on a gantry trolley.

FIG. 4 shows an exemplified disposition of load measuring elements on the trolley 12 (gantry trolley). The load measuring elements a–h are here arranged not in pairs; Rather two load measuring elements are disposed at each side. In other words, load measuring elements a, b are disposed on the water-proximal (WS) trolley side, load measuring elements g, h are disposed on the land-proximal (LS) trolley side, whereas the load measuring elements c, e are disposed on the left side of the trolley 12, and the load measuring elements d, f are disposed on the right side of the trolley 12.

To determine and control the total load, all load measuring elements a–h are added, and the outcome of the addition is compared with a limit value. Exceeding an upper limit value suggests the presence of an overload. Falling short of a lower limit value suggests the presence of a slacking rope. In either case, a respective signal is transmitted to the control unit 16.

The side load is controlled by summing the load measuring elements a, c, e, g, on one hand, and b, d, f, h, on the other hand, and comparing the summations with respective maximum and minimum limit values. When exceeding the maximum limit value or falling short of the minimum limit value, a side load error signal is generated in either case. In addition, the situation on both sides can be monitored to ascertain a lateral load distribution.

Maximum or minimum titling loads can be ascertained by summing the load measuring elements a, b, on one hand, and he load measuring elements g, h on the other hand, and comparing the summations with respective maximum and minimum limit values.

Single rope loads can be determined by separate evaluation of individual signals of the load measuring elements 19. The operation of the load measuring elements 19 is controlled here in a different manner than in the arrangement of FIG. 3 in which the parallel disposition of pairs of load measuring elements enables a direct comparison with one another. In the arrangement of FIG. 4, the control is structured in such a manner that the measuring signal of one load measuring element changes when a container 9 is lifted. The chronological sequence of the lifting process is transmitted from the control unit 16 to the device 18 by providing a corresponding bit. When the value has not changed despite the lifting operation, an error message is generated.

Thus, in the presence of an ascertained error, such as e.g. overload or special load or inadmissible side load, etc., the information signal dependent control of the motor(s) of the hoist mechanism for the trolley 12 is such that operation of the motor(s) does not cause damage due to the load situation at hand.

Figure 2:
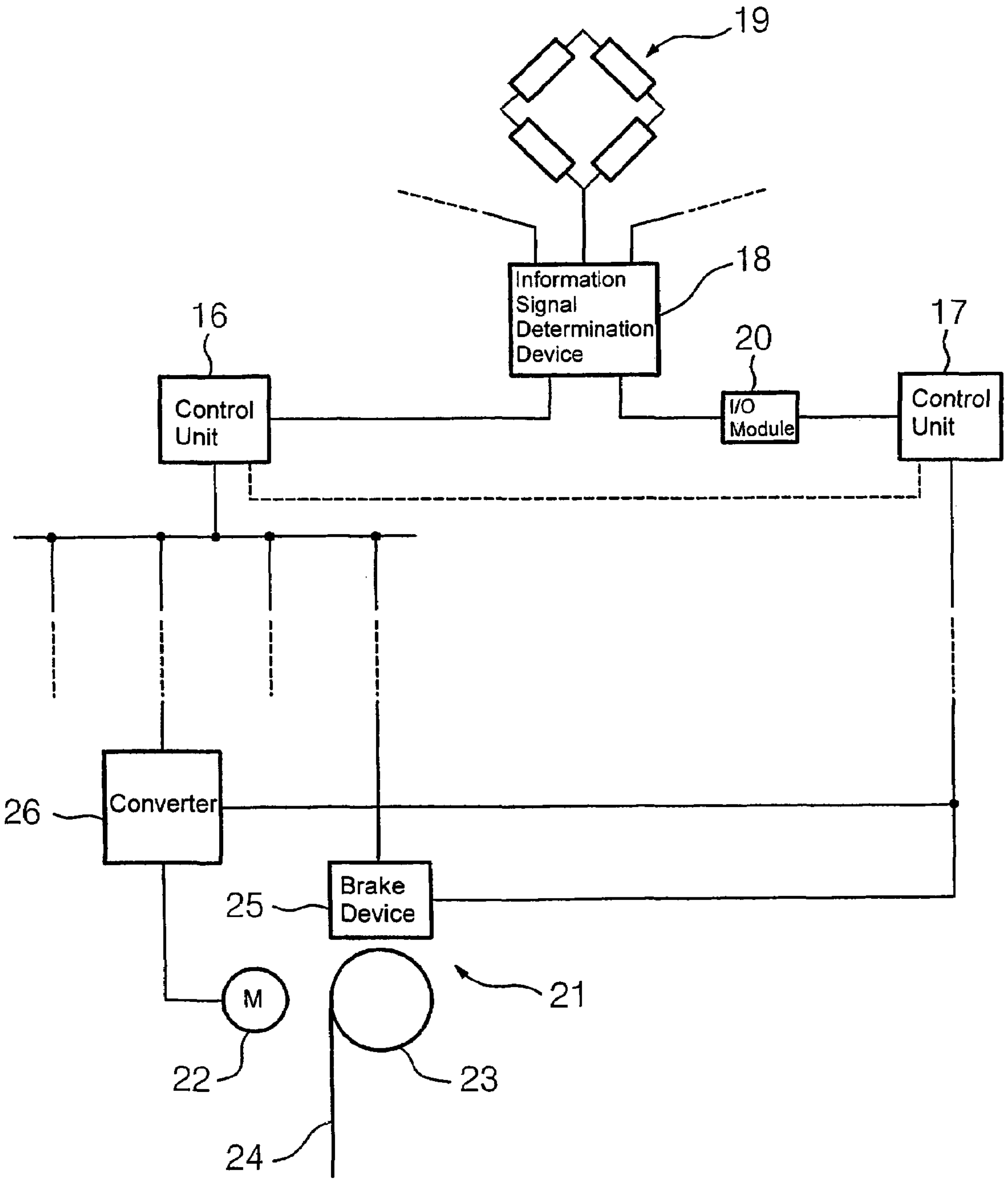
FIG. 2 is a principal illustration of a block diagram showing the relevant elements for realizing a control of a hoist mechanism of the crane installation of FIG. 1.

Turning now to FIG. 2, there is shown a principal illustration of a block diagram showing the relevant elements for realizing a control of a hoist mechanism of the crane installation 1 of FIG. 1. As shown in FIG. 2, the information signal determination device 18 communicates with the first control unit 16, on one hand, and via an I/O module 20 with the second control unit 17. A load measuring assembly in the form of a strain gauge measuring bridge with a total of eight load measuring elements 19 is further shown. For ease of illustration only one measuring bridge is illustrated. The broken line between the control units 16, 17 corresponds to the double arrow D in FIG. 1 and indicates the communication therebetween in such a manner that the second control unit 17 checks the operation of the first control unit 16 with respect to a load situation at any moment in time. When the control unit 17 receives from the device 18 information signals indicating a potential danger situation, the control unit 17 is then capable to determine the appropriate control actions with respect to the actual situation and to check whether the control unit 16 in fact executes the required control commands. If this is not the case, the second control unit 17 intervenes to initiate an emergency stop or rapid halt of operation.

As shown in FIG. 4, the hoist mechanism, designated here by reference numeral 21, includes a motor 22 which drives a rope drum 23 on which a rope 24 is wound, and a brake device 25. The first control unit 16 controls operation of the hoist mechanism by addressing a converter 26 which operates the motor 22. In addition, the control unit 16 is operatively connected to the brake device 25. The same interaction applies for operation of further motors and brake devices of the hoist mechanism 21. For example, the hoist mechanism 21 may include two separate motors 22 as well as brake devices 25 and drums 23 in order to operate, e.g., a total of eight ropes 24. Each motor 22 is operatively connected to a separate converter 26 so that the control unit 16 communicates with various converters 26 and brake devices 25.

In the event of overload, the control unit 16 controls the converters 25 and thus the hoist mechanism 21 such that the motors 22 are not overloaded, e.g. by reducing the rotation speed of the motors 22 or causing an intermittent lifting operation in which the container is lifted by a certain distance, then held in position for a short period, and then again lifted a short distance, and so on. In general, the control is implemented in such a way as to operate the motor 22 within admissible stress limits.

In the event, the control unit 16 fails to properly respond to an information signal commensurate with a detected load situation, the second control unit 17 intervenes and instructs the various converters 26 to immediately stop the lifting operation, either through rapid halt or emergency stop, and the brake devices 25 to block the various drums 23.

In summary, a crane installation 1 according to the present invention provides a lifting control system which is responsive to the actual load situation, received in form of a respective information signal from the device 18.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A crane installation, in particular container crane, comprising:

- a hoist mechanism having at least one motor for lifting and lowering a suspended load, and at least one hoist rope operatively connected to the motor and the load;
- a load measuring assembly, operatively connected to the hoist mechanism, for generating a load-dependent measuring signal;
- a device for determining a load-specific information signal in response to the load-dependent measuring signal, said device being constructed to determine the load-specific information signal on the basis of an actual length of the hoist rope;
- a first control unit for controlling operation of the hoist mechanism in dependence on the information signal; and
- a second control unit operatively connected to the device and constructed for detecting an overload and/or special load for monitoring control operation of the first control unit in the presence of an overload and/or special load.

2. The crane installation of claim 1, wherein the device is constructed to determine the load-specific information signal in response to an uneven load distribution.

3. The crane installation of claim 1, wherein the load measuring assembly includes a plurality of load measuring elements in spaced-apart relationship, said device being constructed to determine different load-specific information signals on the basis of individual measuring signals, or two measuring signals, or a plurality of variously combined measuring signals.

4. The crane installation of claim 3, wherein the load measuring elements are strain gauges.

5. The crane installation of claim 1, wherein the device is constructed to determine the load-specific information signal by comparing the measuring signal with maximum and minimum comparative values.

6. The crane installation of claim 1, and further comprising a trolley traveling along a track and constructed for attachment of the hoist mechanism, said load measuring assembly being arranged on the trolley.

7. The crane installation of claim 1, wherein the first control unit is constructed to effect a lowering of the load, when the load-specific information signal transmitted from the device indicates the presence of an overload.

8. The crane installation of claim 1, wherein the first control unit is constructed to recognize the presence of a special load, when the motor of the hoist mechanism breaks down and the load-specific information signal transmitted from the device indicates the presence of the special load.

9. The crane installation of claim 1, wherein the second control unit is constructed to trigger a rapid halt of operation or an emergency stop.

10. The crane installation of claim 1, and further comprising a monitor for displaying a load information in response to the determined information signal.

11. The crane installation of claim 6, wherein the track is formed by a first boom for travel by the trolley, said container crane being constructed as two-trolley container crane, including a further trolley traveling along a separate second boom and operatively connected to a separate second said hoist mechanism.

* * * * *